United States Patent [19]

Nomura et al.

[11] Patent Number: 5,051,756

[45] Date of Patent: Sep. 24, 1991

[54] THERMAL PRINTER

[75] Inventors: Yoshikazu Nomura, Osaka; Ryuji Nishiyama, Katano; Yoshikazu Tsuru; Taichi Itoh, both of Hirakata, all of Japan

[73] Assignee: Matsushita Electric Industrial Co., Ltd., Osaka, Japan

[21] Appl. No.: 503,141

[22] Filed: Apr. 2, 1990

Related U.S. Application Data

[63] Continuation of Ser. No. 155,100, Feb. 11, 1988, abandoned.

[30] Foreign Application Priority Data

Feb. 18, 1987 [JP] Japan .................................. 62-35025
Feb. 18, 1987 [JP] Japan .................................. 62-35031
Feb. 18, 1987 [JP] Japan .................................. 62-35038

[51] Int. Cl.[5] ........................................... G01D 15/10
[52] U.S. Cl. ............................................... 346/76 PH
[58] Field of Search .................................... 346/76 PH

[56] References Cited

U.S. PATENT DOCUMENTS 4,475,114 10/1984 Koyama et al. ............... 346/76 PH
4,563,691 1/1986 Noguchi et al. ............... 346/76 PH
4,567,488 1/1986 Moriguchi et al. ............ 346/76 PH
4,574,293 3/1986 Inui et al. ....................... 346/76 PH
4,575,732 3/1986 Kitaoka .......................... 346/76 PH

FOREIGN PATENT DOCUMENTS 3236150 4/1983 Fed. Rep. of Germany ...... 400/120

*Primary Examiner*—Benjamin R. Fuller
*Assistant Examiner*—Gerald E. Preston
*Attorney, Agent, or Firm*—Stevens, Davis, Miller & Mosher

[57] ABSTRACT

In a thermal printer for thermo-sensitive recording, a plurality of heating resistors are electrically divided into N units each having M heating resistors, and N driver circuits, N latch circuits and N shift registers which are interconnected in tandem are respectively provided in association with the N units of M heating resistors. Dot data signals and associated hysteresis correction signals are collectively applied to the shift registers so that a pulse for print data and a pulse for hysteresis correction data can be applied continuously for printing.

3 Claims, 4 Drawing Sheets

THERMAL PRINTER

This application is a continuation of application Ser. No. 155,100 filed Feb. 11, 1988 now abandoned.

BACKGROUND OF THE INVENTION

1. Field of the Invention

This invention relates to a thermal printer with a thermo-sensitive recording system.

2. Description of the Related Art

Thermo-sensitive recording is suited for highly graded maintenance and has therefore been utilized in many terminal printers including facsimiles. Especially, thermo-transfer type thermo-sensitive recording has recently been developed, making it possible to perform polychrome or full color recording.

Conventionally, a thermal printer is controlled for thermo-sensitive printing as will be described below with reference to FIG. 1.

The thermal printer as diagrammatically shown in FIG. 1 comprises a plurality of heating elements 31 in the form of heating resistors, driver circuits 32 for powering the heating elements 31 to heat them, a latch circuit 33 for applying dot (heating element) data signals to the driver circuits 32, and a shift register 34 for receiving a print data signal containing the dot data signals and applying the dot data signals to the latch circuit 33.

In operation, print data signals for one line are first inputted to the shift register 34. The latch circuit 33 then responds to a strobe signal to latch the print data signal. Subsequently, enable signals are selectively applied to the driver circuits at different phases or timings so that the driver circuits are sequentially actuated to feed currents to the heating elements. As a result, the heating elements are heated in accordance with the dot data signals to perform printing.

During the printing operation, correction data signals in association with the respective heating elements 31 are applied to the shift register 34. The correction data signal is prepared on the basis of a dot data signal for the preceding line (a hysteresis correction data signal) and a neighboring dot correction data signal, and is used in the same manner as in the case of the above printing operation to correct printing.

Problems are encountered in the conventional thermal printer as will be described below with reference to FIG. 2. In high-speed printing, the amount of energy applied for printing is controlled in accordance with contents of the hysteresis correction data signal and neighboring dot correction data signal. As an example, FIG. 2 illustrates a timing chart of one-line printing which is performed in 6.15 msec by using a head of 8 dots/mm density for A4 size paper when the head driving frequency is 1 MHz and 1568 dots (heating elements) of one line are divided into 7 blocks each of which is actuated by an enable signal. The driver circuit is actuated by an enable pulse ① so as to respond to dot data signals and by an enable pulse ② to respond to correction data signals, with the result that the two enable pulse can not be applied continuously. This is because dot data signals for one line must be transferred at a time in 1568 μsec. Since, in the conventional thermal printer, paper feeding is affected in timed relationship with each enable signal, the discontinuity of the two pulses ① and ② results in a shear in printing.

In addition to the above-mentioned improper application of the hysteresis correction data signal, correct controlling of applied energy can not hitherto been obtained when head temperature and ambient temperature vary. For these reasons, the amount of energy applied for printing can not be controlled properly and accurate printing can not be obtained with the conventional thermal printer.

SUMMARY OF THE INVENTION

This invention intends to eliminate the above disadvantages and it is a major object of this invention to provide a thermal printer capable of properly controlling the amount of energy applied for printing.

Another object of this invention is to provide a thermal printer which can provide a pulse for hysteresis correction in continuation to a pulse for print data by collectively supplying a print data signal and a hysteresis correction data signal to shift registers respectively provided in association with blocks of heating elements.

Another object of this invention is to provide a thermal printer capable of correctly controlling the amount of energy applied for printing when head temperature and ambient temperature vary with time.

According to an embodiment of the invention, in a thermal printer having a thermal head including a plurality of heating elements or dots in the form of heating resistors which are arranged in line on an insulating substrate and which are electrically divided into N units or blocks each having M heating elements and means for selectively powering the heating elements to heat the heating resistors for printing, the means comprises N driver circuits respectively provided in association with the N units of M heating elements, N latch circuits respectively provided in association with the driver circuits, N shift register respectively provided in association with the latch circuits, and an input line connected in common to the N shift registers. With this construction, the dot data signals for the current line are transferred by being followed by transfer of hysteresis correction data signals, in unit of one heating element with or block. The independent enable signals are then applied sequentially at different phases to the respective driver circuits during an interval of time which is obtained by dividing the time required for printing one line of N×M heating elements and which is sufficient for the dot data signals and following hysteresis correction signals to pass through each driver circuit. Accordingly, in one heating element unit or block, any one dot data signal is continuous to the associated hysteresis correction signal and printing of each dot can be performed properly without a shear in printing.

According to another embodiment of the invention, in a thermal printer having a thermal head including a plurality of heating elements or dots in the form of heating resistors which are arranged in line on an insulating substrate and which are electrically divided into N units or blocks each having M heating elements and means for selectively powering the heating elements to heat the heating resistors for printing, the thermal printer comprises a head temperature detection thermistor for detecting temperatures of the thermal head, means responsive to an output signal from the head temperature detection thermistor to control the amount of energy applied to the thermal head, an ambient temperature detection thermistor for detecting ambient temperatures, and means responsive to an output signal from the ambient temperature detection thermistor to control the amount of energy applied to the thermal head by a predetermined amount which is not affected by the temperature of the thermal head. With this construction, the width of the applied pulse can be controlled commensurate with the amount of energy determined by the ambient temperature but irrespective of controlling of the head temperature.

DESCRIPTION OF THE PREFERRED EMBODIMENTS

The invention will now be described by way of example with reference to the accompanying drawings.

Figure 3:
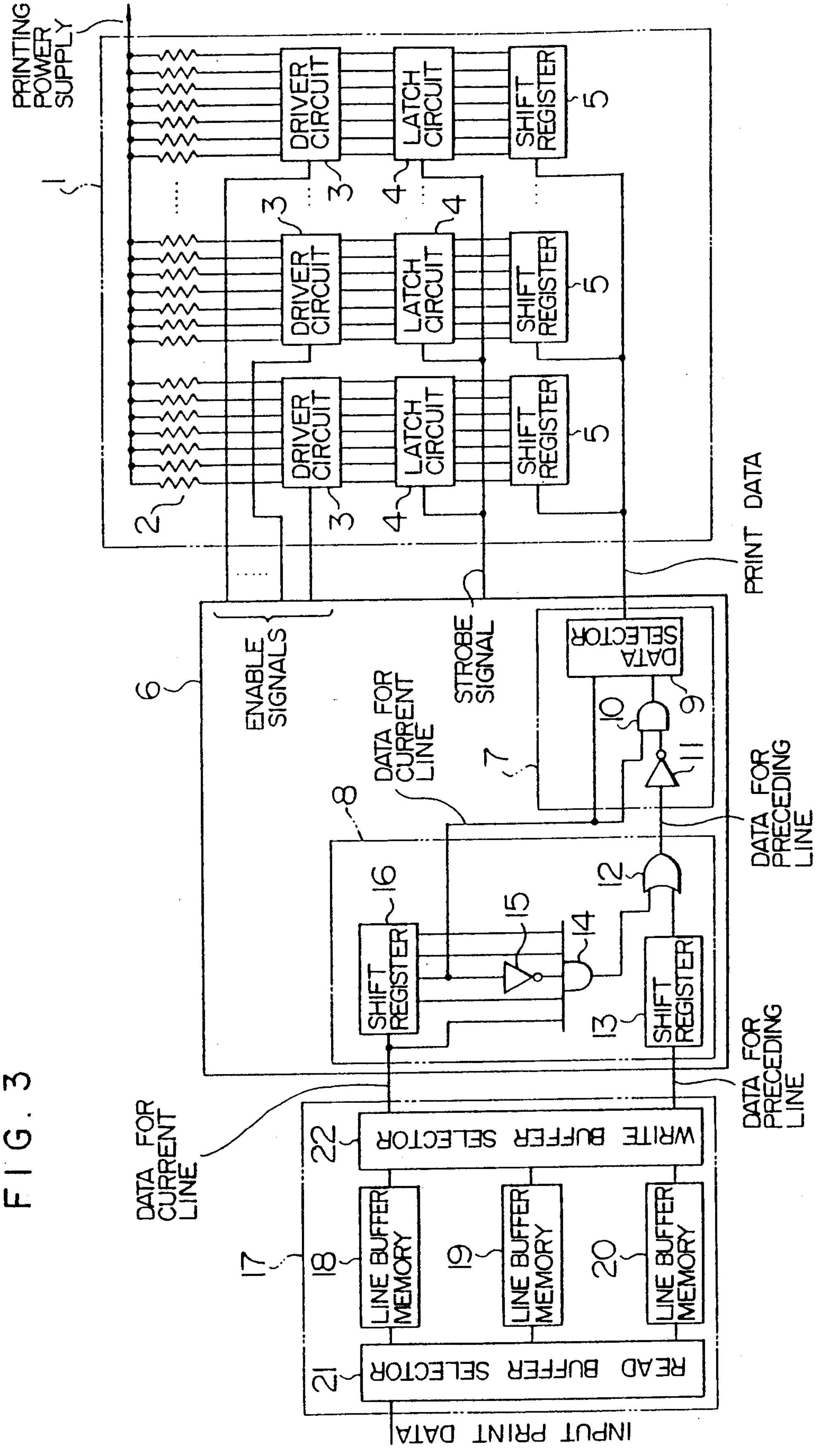
FIG. 3 is a block diagram schematically showing the circuit construction of a thermal printer according to an embodiment of the invention.

The circuit of a thermal printer according to an embodiment of the invention is diagrammatically illustrated in FIG. 3. The thermal printer comprises a thermal head 1 including a plurality of heating elements 2 in the form of heating resistors which are arranged in line on an insulating substrate and which are electrically divided into N units or blocks each having M heating elements, N driver circuits 3 respectively provided in association with the N units of M heating elements 2, N latch circuits 4 respectively provided in association with the driver circuits 3 and connected in common to receive a strobe signal, and N shift registers 5 respectively provided in association with the latch circuits 4 and connected in common to an input line. In the thermal head 1, the heating elements 2 are connected in common, at one end, to a printing power supply and are respectively connected, at the other end, to output terminals of the driver circuits 3. Input terminals of the driver circuits 3 are connected to output terminals of the latch circuits 4, and input terminals of the latch circuits 4 are connected to output terminals of the shift registers 5. Print data signals are applied to the respective shift registers 5 in parallel to the corresponding latch circuits 4. When enable signals are applied to driver circuit 3, each driver circuit 3 passes the print data signals to provide currents which power the corresponding heating elements 2 so that the corresponding heating resistors are selectively heated to perform thermal printing. Independent enable signals are applied at different phases to the respective driver circuits 3 to control the operation thereof in succession.

The thermal printer comprises a print control circuit 6 including a hysteresis correction circuit 7 and a neighboring dot correction circuit 8.

The hysteresis correction circuit 7 comprises a data selector 9 for selectively supplying a print data signal and a correction data signal to the shift registers 5, an AND gate 10 having the output terminal connected to one input terminal of the data selector 9, and an inverter 11 connected to one input terminal of the AND gate 10.

The neighboring dot correction circuit 8 comprises an OR gate 12 having the output terminal connected to the inverter 11 of the hysteresis correction circuit 7, a shift register 13 of two bits having the output terminal connected to one input terminal of the OR gate 12, an AND gate 14 having the output terminal connected to the other input terminal of the OR gate 12, and a shift register 16 for applying signals to input terminals of the AND gate 14 directly and through an inverter 15.

In the print control circuit 6, the other input terminal of the data selector 9 included in the hysteresis correction circuit 7 is connected to the other input terminal of the AND gate 10 and to an output terminal, connected to the inverter 15, of the shift register 16 included in the neighboring dot correction circuit 8. One input terminal of the AND gate 14 is connected directly to the input of the shift register 16.

The thermal printer also comprises a print data receiver 17 including three line buffer memories 18, 19 and 20, a read buffer selector 21 and a write buffer selector 22. In the print data receiver 17, any one of the three line buffer memories is used to receive data for the succeeding line cyclically while the remaining two line buffer memories being used for printing. More particularly, when reception and printing have been completed for print data in connection with a set of lines, the role of the memories is switched to carry out reception and printing in connection with a set of the succeeding lines, as described in Table 1.

TABLE 1

| | printer operation | | | | | |
|---|---|---|---|---|---|---|
| | printing for n-th line reception of (n + 1)th line | | printing for (n + 1)th line reception of (n + 2)th line | | printing for (n + 2)th line reception of (n + 3)th line | |
| | memory operation status | | | | | |
| | operation | contents of data | operation | contents of data | operation | contents of data |
| line buffer memory 18 | reception | n + 1 | transmission of data for the current print line | n + 1 | transmission of data for the preceding line | n + 1 |
| line buffer memory 19 | transmission of data for the preceding print line | n − 1 | reception | n + 2 | transmission of data for the current line | n + 2 |
| line buffer memory 20 | transmission of data for the current print line | n | transmission of data for the preceding print line | n | reception | n + 3 |

In the thermal printer constructed as above, a print data signal applied to the read buffer selector 21 of print data receiver 17 is sent to the neighboring dot correction circuit 8 of print control circuit 6 through the line buffer memories 18, 19 and 20 and write buffer selector 22.

In one operational mode of the print control circuit 6, the neighboring dot correction circuit 8 is adapted to control printing energy applied during printing of a particular dot data signal of a print data signal for the current line in accordance with dot data signals in the neighborhood of a dot data signal contained in a print data signal for the current line and in accordance with the dot data signal the preceding line corresponding to the particular dot data signal.

In the printer having the printer head of the line type as in the case of the present invention, dot data signals are difficult to transfer each time that individual dots are printed. Therefore, data signals for two lines are transferred and stored in advance and a dot data signal for one dot or heating element 2 of the preceding line is applied once or twice for printing in order to control energy applied to that heating element. Specifically, in the circuit of FIG. 3, a high level pulse is used as a dot data signal for printing a "white" dot and a low level pulse is used as a dot data signal for printing a "black" dot.

Thus, when two neighboring dot data signals on either side of a data dot signal of the print data signal for the current line are "white" or high-level dot signals, the neighboring dot correction circuit 8 operates to render "white" or high the corresponding dot data signal for the current line to be delivered out of the circuit 8, thereby disabling the hysteresis correction circuit 7. For example, when two neighboring dot data signals on either side of a "black" dot data signal of a print data signal for the current line are "white" and "H, H, L, H, H" are arranged in line in the shift register 16, the neighboring dot correction circuit 8 renders "white" the corresponding dot data signal for the preceding line to cause the hysteresis correction circuit 7 to produce a "black" hysteresis correction signal, thereby ensuring that one vertical line can be printed clearly or sharply.

In the other operational mode cf the print control circuit 6, the hysteresis correction circuit 7 operates to control energy applied to a heating element 2 during printing of the current line, in accordance with a dot data signal for the corresponding heating element for the preceding line. More particularly, when a "black" dot data signal occurs in the preceding line, residual heat remains in the corresponding heating element. Accordingly, unless energy applied to that heating element during printing of the current line is reduced by an amount corresponding to the residual heat, excessive energy is applied, resulting in improperly dense printing. To avoid this disadvantage, the hysteresis correction circuit 7 controls energy applied to a heating element during printing of the current line in accordance with energy applied to the corresponding heating element during printing of the preceding line, as indicated in Table 2. As in the first operational mode of the hysteresis correction circuit 7, a dot data signal for one dot or heating element is applied once or twice for printing in order to control energy applied to that heating element. A hysteresis correction data signal (dot data signal additionally applied to a heating element to perform hysteresis correction) is indicated in Table 3.

TABLE 2

| line number | n-th | (n + 1)th | (n + 2)th |
|---|---|---|---|
| dot data signal | white | black | black |
| pulse applied for printing | white white | black / black | black white |

TABLE 3

| dot data signal for the current line | dot data signal for the preceding line | hysteresis correction signal |
|---|---|---|
| white | white | white |
| white | black | white |
| black | white | black |
| black | black | white |

The print data signal thus corrected by the hysteresis correction circuit 7 is applied to the shift registers 5 of thermal head 1. Then, dot data signals are applied from each shift register 5 to the associated driver circuit 3 through the associated latch circuit 4. Each driver circuit 3 is controlled by the corresponding enable signal such that the dot data signals are passed to provide currents which power the corresponding heating elements 2. In this manner, the corresponding heating elements are selectively heated to perform thermal printing.

To describe the operation of the above embodiment in greater detail, the dot data signals for the current line are transferred by being followed by transfer of necessary hysteresis correction data signals, in unit of one heating element unit or block. The independent enable signals are then applied sequentially at different phases or timings to the respective driver circuits 3 during an interval of time which is obtained by dividing time required for printing one line and which is sufficient for the dot data signals and following hysteresis correction signals to pass through each driver circuit. Accordingly, in one heating element unit or block, any one dot data signal is continuous to the associated hysteresis correction signal and printing of each dot can be performed properly without a shear in printing.

Figure 1:
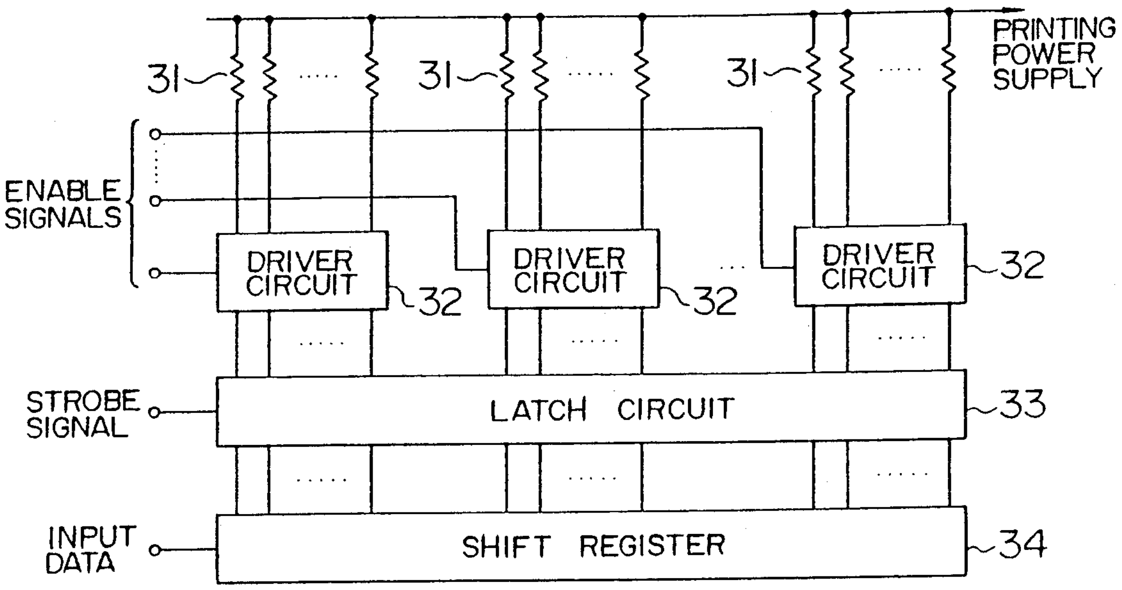
FIG. 1 PRIOR ART
FIG. 1 is a block diagram illustrating a thermal head of a conventional thermal printer.
Figure 2:
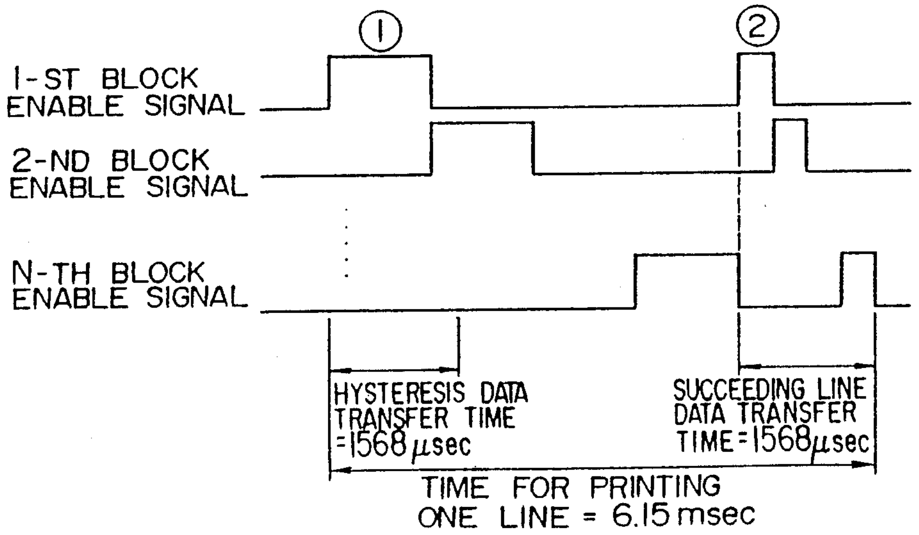
FIG. 2 PRIOR ART
FIG. 2 is a timing chart for explaining the operation of the FIG. 1 head.
Figure 4:
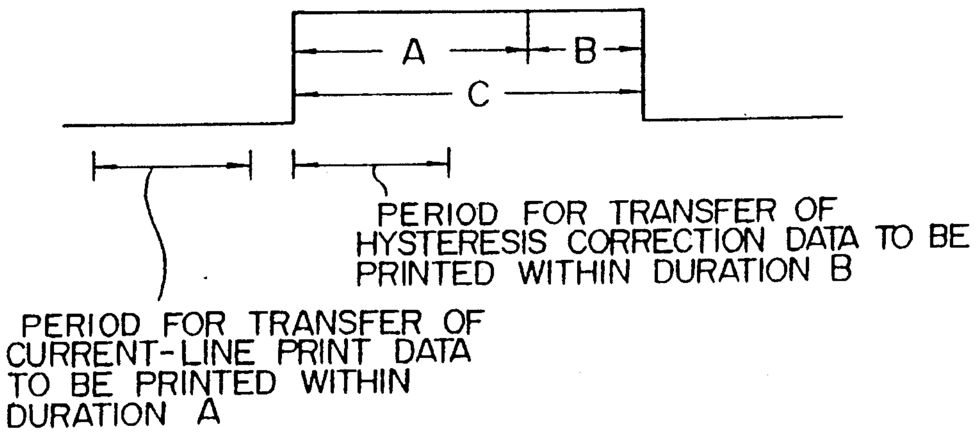
FIG. 4 is a diagram useful in explaining the operation of the essential part of the FIG. 3 thermal printer.

One enable signal as applied to one heating element unit is illustrated in FIG. 4. For simplicity of illustration, time for passage of dot data signals is totalized within duration A and time for passage of hysteresis correction signals is totalized within duration B. The value of duration B depends on temperatures of the printer head and is controlled such that proper amount of energy can be applied to the printer head. Especially where for printing a sheet of A4 size paper in one minute, a printer head of 8 dots/mm density is used which is driven at a driving frequency of 1 MHz and which has 1568 dots divided into 7 heating element (dot) units or blocks, the total duration C is 700 μsec at the maximum because 6.15 msec of time for printing one line minus 1568 μsec is shared by the 7 heating element blocks as will be seen from FIG. 2 and consequently about 654 μsec can be allotted to each heating element block. In this instance, the duration A is 250 μsec at the minimum because each heating element block has 224 dots and dot data signals therefore are all transferred in 224 μsec. In this manner, the dot data signals can be confined within 250 μsec of the minimum duration A and the hysteresis correction signals can be confined within the remaining duration B to ensure continuous printing of the print data and hysteresis correction data, thereby performing printing without a shear.

To specifically describe the first operational mode of the print control circuit 6 with reference to FIG. 3, when two neighboring dot data signals on either side of a "black" data dot signal of the print data signal for the current line are "white" and "H, H, L, H, H" are arranged in line in the shift register 16, the input signals to the AND gate 14 are all high and the AND gate 14 delivers a high output signal to the OR gate 12. Consequently, the data signal for the preceding line to be applied to the hysteresis correction circuit 7 becomes high or "white" irrespective of the level of the data signal for the preceding line inputted to the neighboring dot correction circuit 8. This permits the hysteresis correction signal to be "black" when one vertical line is to be printed in order to supply sufficient energy to the corresponding heating element 2, thereby ensuring that the one vertical line can be printed sharply.

The amount of printing energy should also be controlled by reflecting temperatures. Conventionally, in this type of thermal printer, the applied energy is controlled, in one way, by consulting only head temperature information produced from a thermistor built in the thermal head or is controlled in another way by consulting a result of calculation of detection values of head temperature and ambient temperature which change with time.

However, when the applied energy is controlled in the former way, temperature of the printer such as a platen and temperature of the recording medium are not taken into consideration and as a result, print quality differs in accordance with the difference between printer and medium temperatures. When the applied energy is controlled in the latter way, errors in detection of the head temperature and errors in calculation prevent the applied energy from being set correctly.

Figure 5:
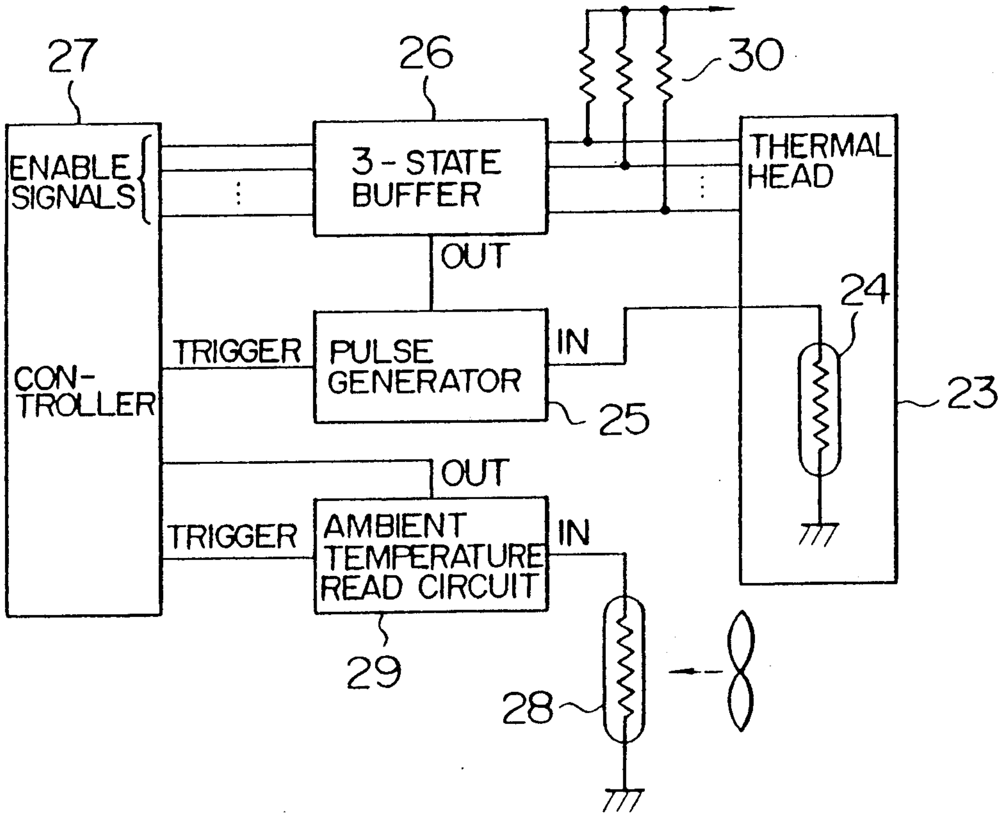
FIG. 5 is a block diagram schematically showing a thermal printer according to another embodiment of the invention.

FIG. 5 illustrates another embodiment of the invention which can solve the above problems. Referring to FIG. 5, a thermal head 23 has a built-in thermistor 24 for detection of head temperature. The thermistor 24 produces an output signal which is applied to a pulse generator 25, and a pulse signal of a proper width corresponding to a head temperature is generated from the pulse generator 25. The pulse signal is applied to the output control terminal of a three-state buffer 26 so as to determine powering duration for a block of heating elements 30 selected by an enable signal delivered out of a controller 27 standing for I/O ports of a microcomputer. On the otter hand, a thermistor 28 for detection of ambient temperature is disposed near an atmospheric air in-take port and produces an output signal which is applied through an ambient temperature read circuit 29 to the microcomputer to provide ambient temperature information to the same.

Figure 6:
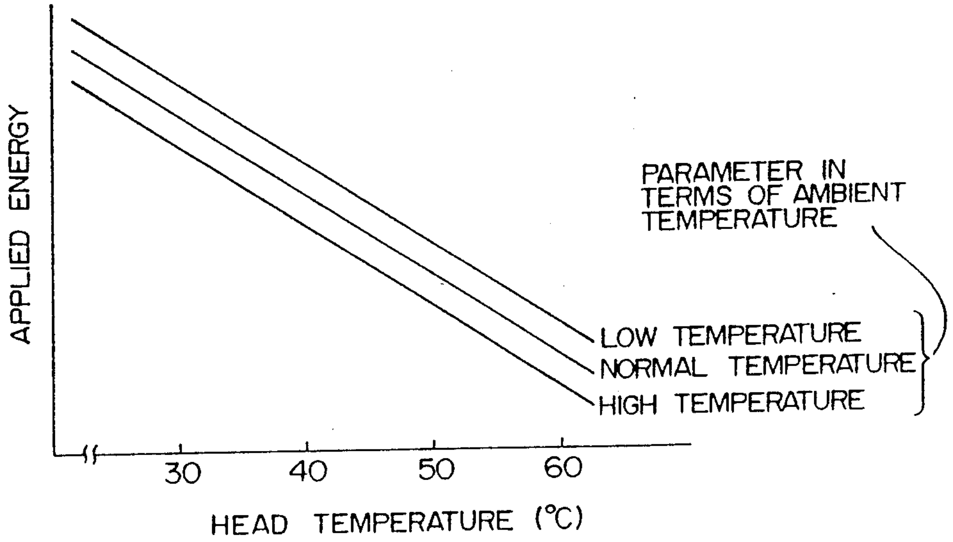
FIG. 6 is a graph showing commanded controlling curves.
Figure 7:
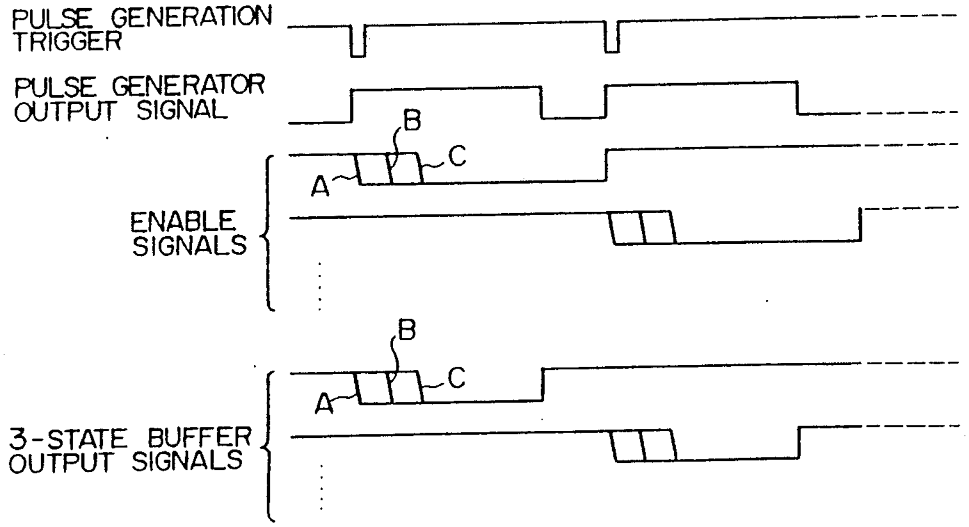
FIG. 7 is a timing chart useful in explaining the operation of the FIG. 5 thermal printer.

FIG. 6 graphically shows an example of a commanded control characteristic in which for the purpose of providing a predetermined difference in the amount of energy in accordance with the ambient temperature but independently of the head temperature, control curves are plotted by using ambient temperatures as the parameter so as to be translated with respect to each other in the direction of ordinate representing applied energy. These control curves can be implemented at timings as illustrated in FIG. 7. Thus, when applied with a trigger signal, the pulse generator 25 generates a pulse signal of a pulse width corresponding to a head temperature. On the other hand, the microcomputer calculates an amount of translation required for a control curve on the basis of information produced from the ambient temperature read circuit. In accordance with the translation amount, the enable signal is retarded with respect to the trigger signal to cause a pulse to fall at a point A, B or C as shown in FIG. 7. The three-state buffer 26 then responds to the output signal from pulse generator 25 determined by the head temperature alone and the enable signal retarded in accordance with the ambient temperature to apply to the heating elements 30 a pulse providing a predetermined energy difference in accordance with the ambient temperature but independently of changes in the head temperature.

In this manner, the width of the applied pulse can be controlled commensurate with the amount of energy determined by the ambient temperature but irrespective of controlling the head temperature and therefore an ideal control curve can be obtained.

What is claimed is:

1. A thermal line printer comprising a thermal head including a plurality of heating elements in the form of heating resistors which are arranged in line on an insulating substrate and which are electrically divided into N units of M heating elements, said heating elements being selectively powered to heat said heating resistors for printing; means for applying normal print data and compensation data to said thermal head; means for producing enable signals for determining an amount of heating energy to be supplied to said heating elements of said thermal head; a head temperature detection sensor for detecting the temperature of said thermal head; first control means responsive to an output signal from said head temperature detection sensor for controlling the pulse width of said enable signals; an ambient temperature detection sensor for detecting ambient temperature at a point apart from said thermal head, and a second control means responsive to an output signal from said ambient temperature detection sensor for controlling, in parallel with the controlling operation of said first control means, the pulse width of said enable signals to change said pulse width by a predetermined amount in accordance with the ambient temperature, and without being affected by an output signal from said head temperature detection sensor.

2. A thermal line printer according to claim 1, further comprising: a hysteresis correction circuit for producing a hysteresis correction signal which alters the amount of heating energy supplied to said heating element of said thermal head in a current line in accordance with the presence or absence of a print data signal for the corresponding heating element in a preceding line; a buffer memory circuit means for controlling the transfer of a print data signal for the preceding line to said hysteresis correction circuit; and a third control means for changing the print data signal for the preceding line in accordance with the arrangement of the print data signal for the current line.

3. A thermal line printer according to claim 2, wherein said second control means controls the amount of heating energy supplied to said heating elements of said thermal head independently of the controlling operation of each of said first and third control means.

* * * * *